United States Patent

Tanaka et al.

Patent Number: 5,916,075
Date of Patent: Jun. 29, 1999

[54] GLASS-RUN CHANNEL

[75] Inventors: Yuji Tanaka; Yukimasa Ando; Masaki Shiraiwa, all of Oobu, Japan

[73] Assignee: Tokai Kogyo Kabushiki Kaisha, Oobu, Japan

[21] Appl. No.: 08/955,754

[22] Filed: Oct. 22, 1997

[30] Foreign Application Priority Data

Oct. 31, 1996 [JP] Japan ................................. 8-307440

[51] Int. Cl.$^6$ .................................................. E06B 7/16
[52] U.S. Cl. ............................................. 49/441; 49/489.1
[58] Field of Search ...................... 49/440, 441, 475.1, 49/489.1, 495.1

[56] References Cited

U.S. PATENT DOCUMENTS

| 1,978,327 | 10/1934 | Reid | 49/441 |
| 4,783,931 | 11/1988 | Kirkwood | 49/441 |
| 4,947,586 | 8/1990 | Mesnel et al. | 49/441 X |
| 5,007,202 | 4/1991 | Guillon | 49/441 |
| 5,343,655 | 9/1994 | Miyakawa et al. | 49/441 |

FOREIGN PATENT DOCUMENTS

| 0 200 618 | 12/1986 | European Pat. Off. . |
| 0 385 028 | 9/1990 | European Pat. Off. . |
| 649461 | 12/1928 | France | 49/441 |
| 2585799 | 2/1987 | France | 49/441 |
| 32 39 395 | 5/1983 | Germany . |
| 61-21616 | 2/1986 | Japan . |
| 64-83413 | 3/1989 | Japan . |
| 2-7124 | 1/1990 | Japan . |
| 6-55832 | 8/1994 | Japan . |
| 9-76765 | 3/1997 | Japan . |
| 2 257 451 | 1/1993 | United Kingdom . |
| WO 97/08005 | 3/1997 | WIPO . |

*Primary Examiner*—Jerry Redman
*Attorney, Agent, or Firm*—Oblon, Spivak, McClelland, Maier & Neustadt, P.C.

[57] ABSTRACT

A glass-run channel comprises a sectionally U-shaped body which is installed on a window frame of a door of a vehicle and a glass sealing lip which slidably contacts a windowpane 81 which is opened and closed. The rear surface of the glass sealing lip and/or the inner surface of the body are covered with a sliding-contact material formed of a material different from that of the body and having a high degree of sliding-contact performance.

6 Claims, 6 Drawing Sheets

GLASS-RUN CHANNEL

BACKGROUND OF THE INVENTION

Field of the Invention

As shown in FIG. 3, in a windowpane 80 of a door 8 of a vehicle, a glass-run channel 9 (see FIG. 1) is provided on the inner periphery of a window frame 82 to seal the gap between the window frame 82 and the windowpane 81.

Referring to FIGS. 8 and 9, the glass-run channel 9 comprises a sectionally U-shaped body 111 which is installed on a sash 820 of the window frame 82 of the door 8 and a glass sealing lip 12 having a glass sliding-contact portion 13 formed on a front surface 129 thereof and slidably contacting the windowpane 81 which is opened and closed.

However, as shown in FIG. 9, when the door 8 is closed or when the vehicle travels on a bad road, with the windowpane 81 opened in a small amount, it may occur that the windowpane 81 and a part of a rear surface 120 of the glass sealing lip 12 contacts a part of an inner surface 110 of the body 111. Further, it may occur that the rear surface 120 separates from the inner surface 110 and then, contacts it again.

At this time, a harsh sound is generated due to the friction between the inner surface 110 and the rear surface 120, thus making a driver feel uncomfortable.

SUMMARY OF THE INVENTION

The present invention has been made in view of the above-described problems. It is accordingly an object of the present invention to provide a glass-run channel not generating a harsh sound.

In one aspect of the present invention, there is provided a glass-run channel comprises a sectionally U-shaped body which is installed on a window frame of a door of a vehicle and a glass sealing lip which slidably contacts a windowpane 81 which is opened and closed. The rear surface of the glass sealing lip and/or the inner surface of the body are covered with a sliding-contact material formed of a material different from that of the body and having a high degree of sliding-contact performance.

The operation of the glass-run channel of the present invention is described below.

In the glass-run channel of the present invention, the rear surface of the glass sealing lip and/or the inner surface of the body are covered with the sliding-contact material formed of a material different from that of the body and having a high degree of sliding-contact performance.

This construction allows the friction coefficient of the portion covered with the sliding-contact material having a high degree of sliding-contact performance to be low (embodiment 1 and table 1). Therefore, it is possible to reduce the friction acting between the rear surface of the glass sealing lip and the inner surface of the body in the contact of the former with the latter and the separation of the former from the latter, when a door of a vehicle is closed or it travels on a bad road, with a windowpane opened in a small amount. Consequently, the rear surface of the glass sealing lip contacts the inner surface of the body and separates therefrom smoothly.

Accordingly, the generation of a harsh sound can be reduced in a high degree.

As apparent from the above description, the present invention provides the glass-run channel not generating a harsh sound.

This and other objects, features and advantages of the present invention will become more apparent upon reading of the following detailed description and drawings.

DETAILED DESCRIPTION OF THE INVENTION

The rear surface of the glass sealing lip means a portion which does not contact a windowpane when the windowpane is opened and closed. Similarly, the inner surface of the body means a portion which does not contact a windowpane when the windowpane is opened and closed.

It is preferable that the sliding-contact material having a high degree of sliding-contact performance is formed on a contact portion of the rear surface of the glass sealing lip which contacts the body or a contact portion of the inner surface of the body.

That is, the sliding-contact material having a high degree of sliding-contact performance can be formed on only the contact portion which generates a harsh sound. Therefore, the sliding-contact material having a high degree of sliding-contact performance can be used in a small amount. Therefore, the glass-run channel can be manufactured at a low cost.

It is preferable that the sliding-contact material having a high degree of sliding-contact performance is formed of thermoplastic elastomer, olefin resin, and fatty amide or formed of the thermoplastic elastomer and polymeric olefin resin.

The sliding-contact material having a high degree of sliding-contact performance and formed of the above composition is capable of preventing the generation of a harsh sound greatly.

It is possible to reduce the coefficients of dynamic and static frictions of the sliding-contact material having a high degree of sliding-contact performance and prevent the generation of the harsh sound in a high extent because it contains the fatty amide.

As the thermoplastic elastomer, olefin thermoplastic elastomer or styrene thermoplastic elastomer can be used. As the olefin resin and the polymeric olefin resin, polypropylene, polyethylene and the like can be used. As the fatty amide, oleylamide and erucylamide can be used.

EMBODIMENTS

Embodiment 1

The glass-run channel according to embodiment 1 of the present invention is described below with reference to FIGS. 1 and 4.

Figure 1:
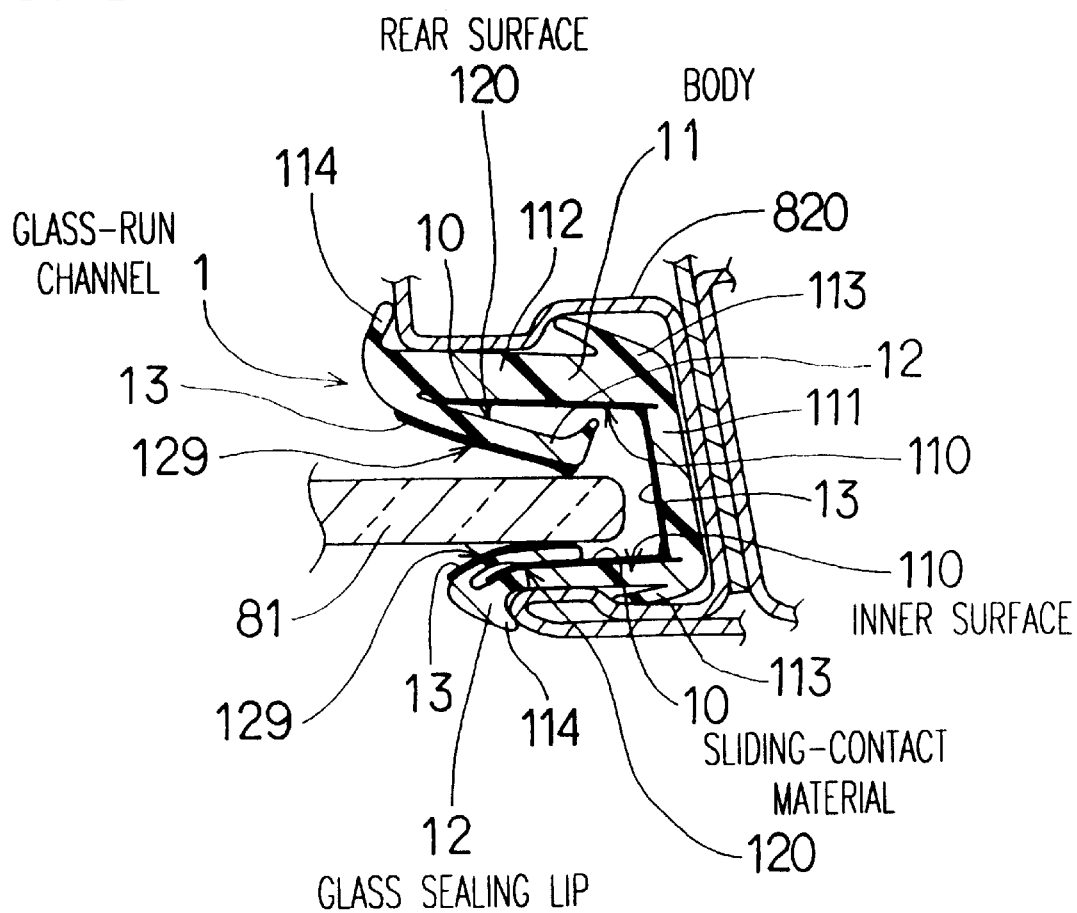
FIG. 1 is a sectional view, of a glass-run channel according to embodiment 1, taken along a line A—A of FIG. 3.
Figure 2:
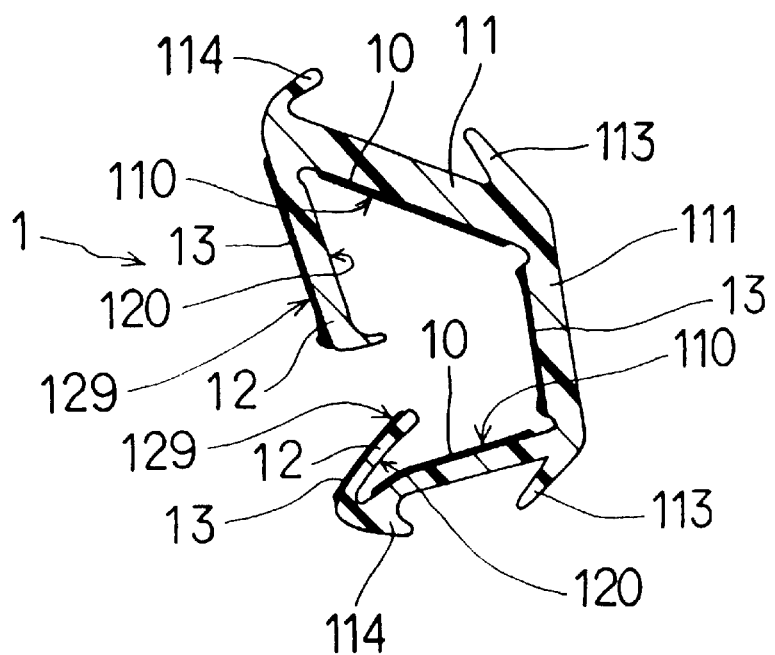
FIG. 2 is a sectional view showing the glass-run channel according to embodiment 1 in a free state.
Figure 3:
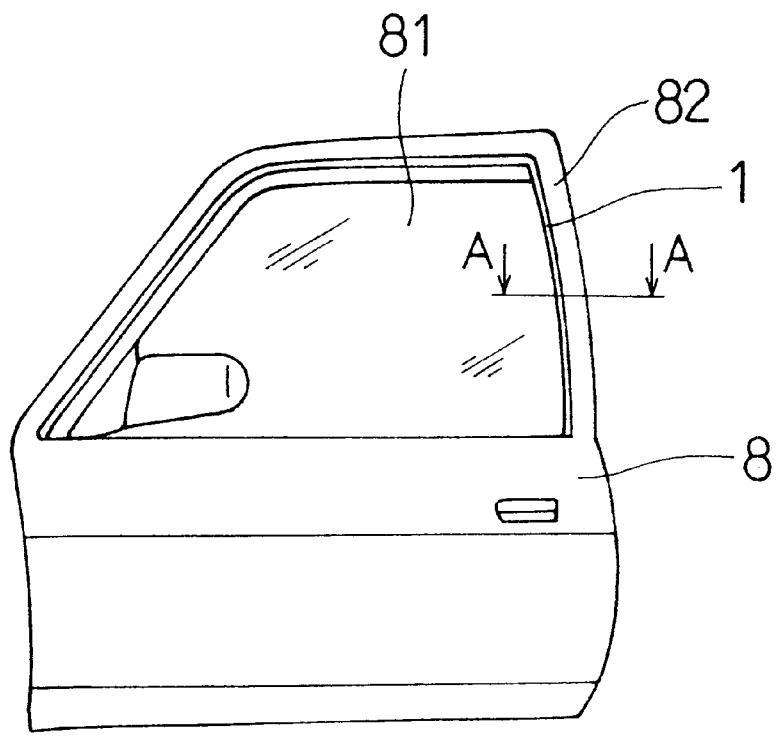
FIG. 3 is an explanatory view showing a window of a vehicle door according to embodiment 1.

As shown in FIGS. 1 through 3, a glass-run channel 1 of embodiment 1 comprises a sectionally U-shaped body 11 which is installed on a sash 820 of a window frame 82 of a door 8 of a vehicle; and a glass sealing lip 12 which slidably contacts a windowpane 81 which is opened and closed.

An inner surface 110 of the body 11 is covered with a sliding-contact material 10 formed of a material different from that of the body 11 and having a high degree of sliding-contact performance (hereinafter referred to as merely sliding-contact material 10).

The glass-run channel 1 is described in detail below.

As shown in FIGS. 1 and 2, the body 11 of the glass-run channel 1 comprises a bottom portion 111 and a pillar portion 112 extending from both ends of the bottom portion 111. A sash engaging lip 113 is formed on the outer surface of the lower end of the pillar portion 112. A sash sealing lip 114 is formed on the outer surface of the upper end of the pillar portion 112.

The glass sealing lip 12 confronts the inner surface 110 of the pillar portion 112.

A glass sliding-contact portion 13 which contacts the windowpane 81 is formed on the front surface of the glass sealing lip 12. The glass sliding-contact portion 13 is also formed on the inner surface of the bottom portion 111. The glass sliding-contact portion 13 is formed at portions which contact the windowpane 81 when it is opened and closed.

The body 11 and the glass sealing lip 12 are made of olefin thermoplastic elastomer. The sliding-contact material 10 covering the inner surface 110 of the body 11 and the glass sliding-contact portion 13 is formed of Santoplene (trade name; manufactured by AES Co., Ltd.), polypropylene which is olefin resin, and fatty amide.

More specifically, the sliding-contact material 10 is a mixture of 79 wt % of the Santoplene which is olefin thermoplastic resin, 20 wt % of the polypropylene, and 1.0 wt % of erucylamide which is fatty amide. as shown by a specimen "B" of table 1 which will be described later.

The glass-run channel 1 is formed by two-color continuous extrusion molding method to mold the material of the body 11 and the glass sealing lip 12 integrally and the material of the glass sliding-contact portion 13 and the sliding-contact material 10 integrally.

Figure 4:
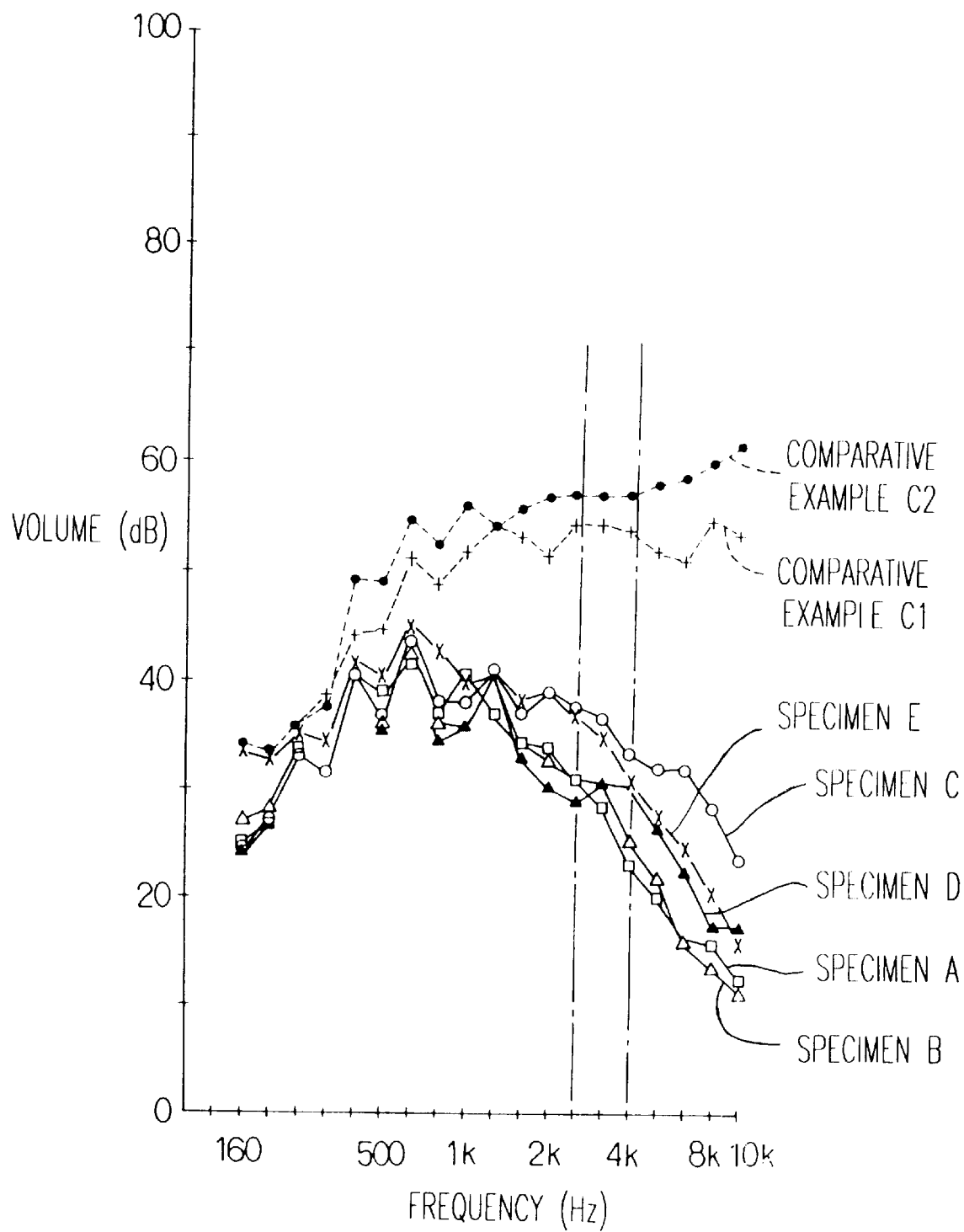
FIG. 4 is a graphical representation showing the relationship between volumes of harsh sounds generated by glass-run channels and frequency bands.

With reference to FIG. 4, the glass-run channel 1 of embodiment 1 and the conventional glass-run channel 9 are described below.

Figure 8:
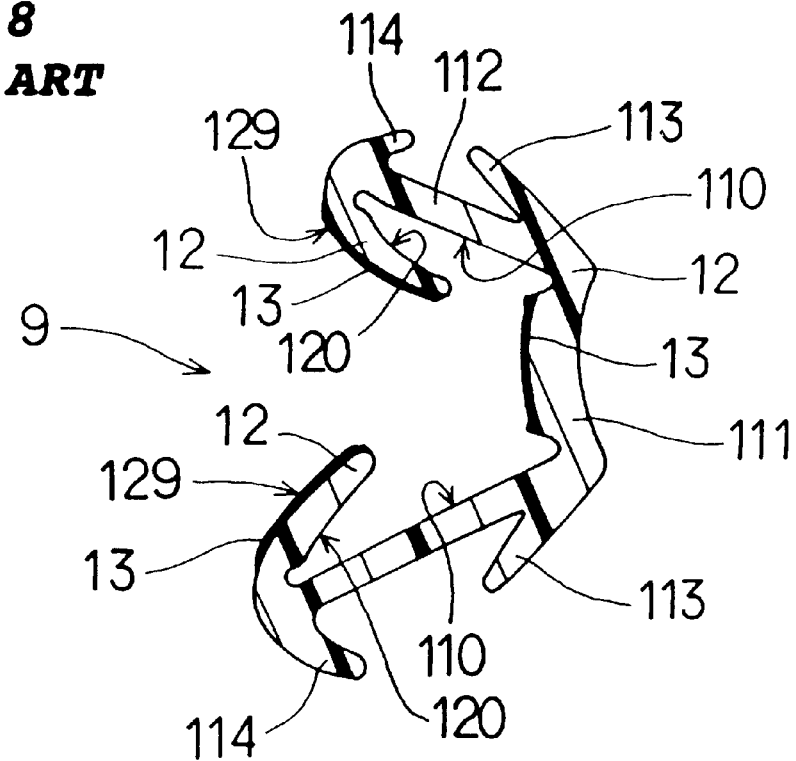
FIG. 8 is a sectional view showing a conventional glass-run channel.
Figure 9:
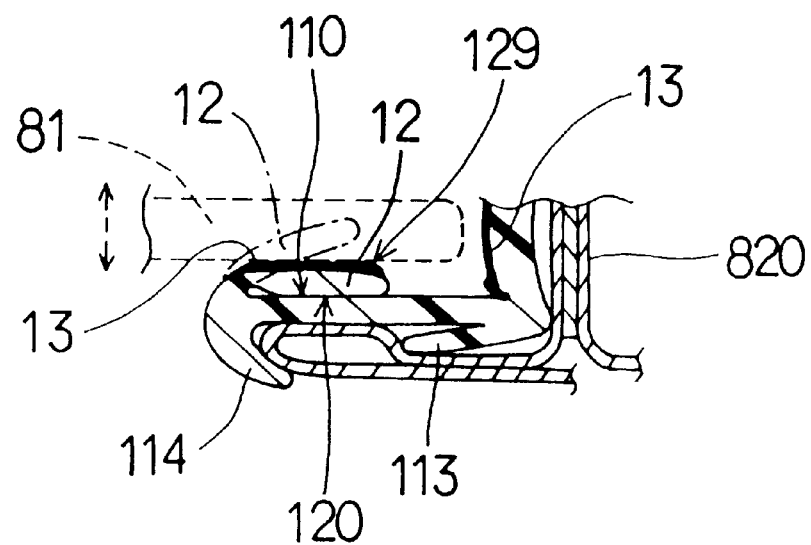
FIG. 9 is a partial explanatory sectional view showing a conventional glass sealing lip.

In FIG. 4, specimens 1–5 consist of the glass-run channel 1 of embodiment 1, and comparative specimens C1 and C2 consist of the conventional glass-run channel 9 (see FIGS. 8 and 9).

In the specimen 1, the body 11 and the glass sealing lip 12 are formed of olefin thermoplastic elastomer; and the sliding-contact material 10 covering the inner surface 110 of the body 11 and the glass sliding-contact portion 13 is formed of the Santoplene (Hs70°; A-type spring hardness), the polypropylene, and the fatty amide.

In the specimen 2, the body 11 and the glass sealing lip 12 are formed of olefin thermoplastic elastomer; and the sliding-contact material 10 covering the inner surface 110 of the body 11 and the glass sliding-contact portion 13 is formed of the Santoplene (Hs80°; A-type spring hardness), the polypropylene, and the fatty amide.

In the specimen 3, the body 11 and the glass sealing lip 12 are formed of olefin thermoplastic elastomer; and the sliding-contact material 10 covering the inner surface 110 of the body 11 and the glass sliding-contact portion 13 is formed of the Santoplene (Hs90°; A-type spring hardness), the polypropylene, and the fatty amide.

In the specimen 4, the body 11 and the glass sealing lip 12 are formed of olefin thermoplastic elastomer; and the sliding-contact material 10 covering the inner surface 110 of the body 11 and the glass sliding-contact portion 13 is formed of the Santoplene (Hd D40°; durometer hardness), the polypropylene, and the fatty amide.

In the specimen 5, the body 11 and the glass sealing lip 12 are formed of olefin thermoplastic elastomer; and the sliding-contact material 10 covering the inner surface 110 of the body 11 and the glass sliding-contact portion 13 is formed of the Santoplene (Hd D50°; durometer hardness), the polypropylene, and the fatty amide.

As shown in FIGS. 8 and 9, in the glass-run channel 9 represented by the comparative specimen C1, the body 11 and the glass sealing lip 12 are formed of EPDM (ethylene propylene polymer); the inner surface 110 of the body 11 and the rear surface 120 of the glass sealing lip 12 are not covered with a sliding-contact material having a high degree of sliding-contact performance; the surface of the glass-run channel 9 is not treated; and the sliding-contact portion 13 is formed of urethane paint having sliding contact performance.

The comparative specimen C2 is made of the same materials as that of the specimen 5, but the inner surface 110 of the body 11 and the rear surface 120 of the glass sealing lip 12 are not covered with a sliding-contact material having a high degree of sliding-contact performance, and the surface of the glass-run channel 9 is not treated.

The seven specimens were installed on a vehicle to measure the volumes of sounds generated when the windowpane 81 was shaken in the widthwise direction of the vehicle, with the windowpane 81 of the door 8 opened about 100 mm, by means of a sound level meter and a frequency analyzer. The result is shown in FIG. 4.

As indicated in FIG. 4, the volumes of harsh sounds in the specimens 1 through 5 were lower than those of harsh sounds in the comparative examples C1 and C2 in an audible frequency band (3–4 KHz, region sandwiched between two one-dot chain lines).

The properties of specimens A through E consisting of the sliding-contact material 10 of embodiment 1 are described below with reference to table 1.

Each of the specimens A through E is a mixture of the Santoplene, 20 wt % of the polypropylene, and 0–4.2 wt % of the erucylamide. The three components were mixed with each other such that the total wt % was 100 wt %.

For example, the specimen A consisted of 80 wt % of the Santoplene and 20 wt % of the polypropylene. The specimen B consisted of 79 wt % of the Santoplene, 20 wt % of the polypropylene, and 1.0 wt % of the fatty amide. In the specimens C–E, the increased wt % of the fatty amide is equal to the decreased wt % of the Santoplene.

The coefficients of dynamic and static frictions of the specimens A through E were measured by a test method of ASTM D-1894. Table 1 shows the result of the test.

As indicated in table 1, the coefficients of the dynamic and static frictions of the specimens A through E decreases as the wt % of the fatty amide increases.

The tests indicate that the glass sliding-contact portion 13 covered with the sliding-contact material 10 is allowed to slidably contact the windowpane 81 at a high degree and have a high degree of wear resistance. The tests also indicate that the inner surface 110 of the body 11 covered with the sliding-contact material 10 can be prevented from generating a harsh sound.

That is, the present invention provides the glass-run channel not generating a harsh sound.

TABLE 1

| Specimen | added amount of fatty amide (wt. %) | Coefficient of dynamic friction ($\mu s$) | Coefficient of static friction ($\mu k$) |
| --- | --- | --- | --- |
| A | 0 | 0.706 | 0.474 |
| B | 1.0 | 0.488 | 0.290 |
| C | 3.1 | 0.410 | 0.294 |
| D | 3.7 | 0.355 | 0.245 |
| E | 4.2 | 0.345 | 0.230 |

Embodiment 2

In a glass-run channel 18 of embodiment 2, the rear surface 120 of the glass sealing lip 12 is covered with the sliding-contact material 10.

Figure 5:
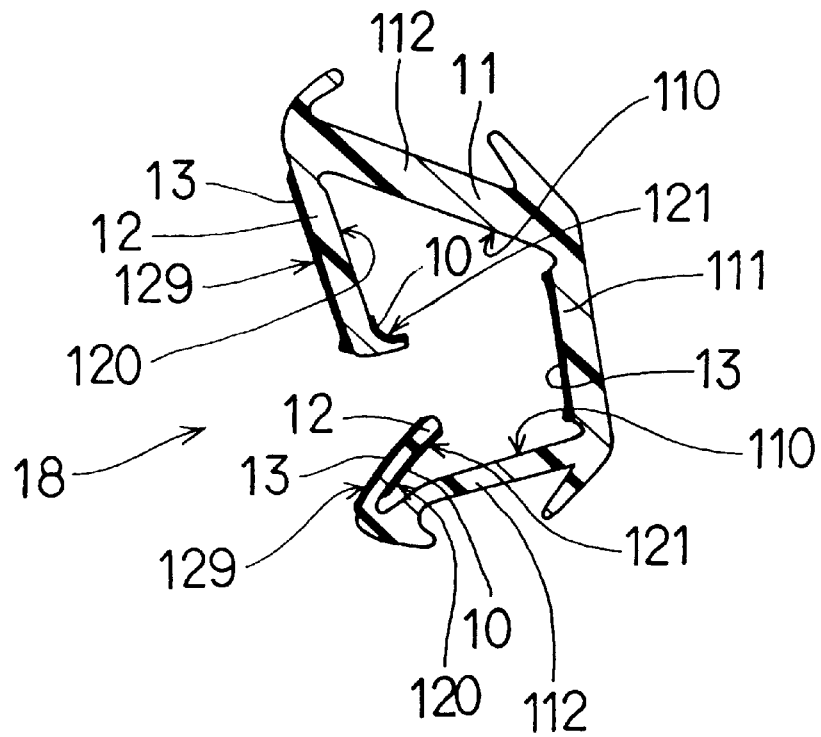
FIG. 5 is a sectional view showing a glass-run channel according to embodiment 2.
Figure 6:
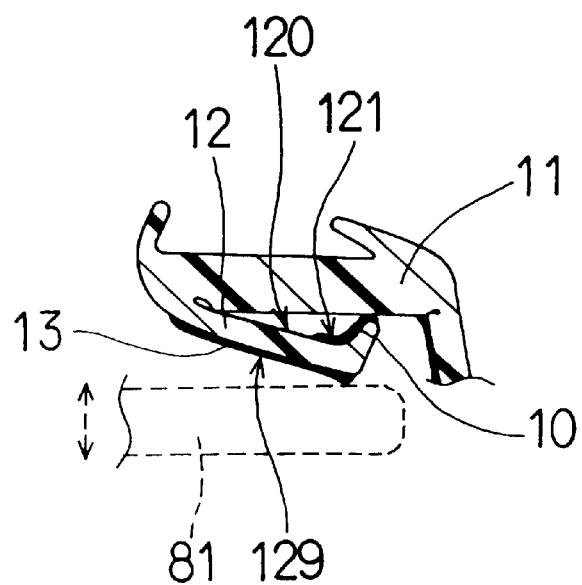
FIG. 6 is a partly enlarged sectional view showing a glass sealing lip according to embodiment 3.

As shown in FIGS. 5 and 6, the glass-run channel 18 of embodiment 2 comprises the sectionally U-shaped body 11 and the glass sealing lip 12 which slidably contacts the windowpane 81 which is opened and closed, similarly to the glass-run channel 1 of embodiment 1.

As shown in FIG. 6, the glass-run channel 18 is different from the glass-run channel 1 of embodiment 1 in that a contact portion 121 which contacts the inner surface 110 of the body 11 is covered with the sliding-contact material 10 to prevent generation of a harsh sound when the door 8 of the vehicle is closed or when it travels on a bad road, with the windowpane 81 opened in a small amount.

In the glass-run channel 18, the sliding-contact material 10 is formed on only the contact portion 121 which otherwise generates a harsh sound. Thus, the amount of the sliding-contact material 10 which is used in embodiment 2 is smaller than that of the sliding-contact material 10 which is used in embodiment 1. Therefore, the glass-run channel 18 can be manufactured at a cost lower than the glass-run channel 1 of embodiment 1. The glass-run channel 18 has an operation and effect similar to those of the glass-run channel 1.

Embodiment 3

A glass-run channel 19 of embodiment 3 is different from the glass-run channel 1 of embodiment 1 in that the rear surface 120 of the glass sealing lip 12 and the inner surface 110 of the body 11 are covered with the sliding-contact material 10.

Figure 7:
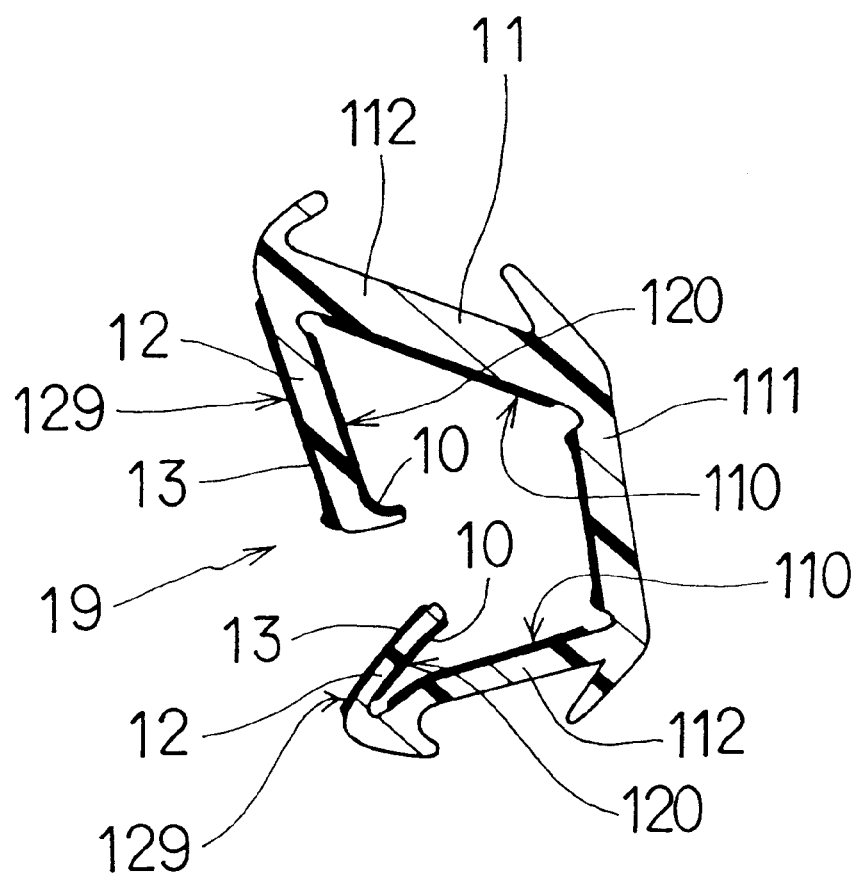
FIG. 7 is a sectional view showing a glass-run channel according to embodiment 3.

As shown in FIG. 7, the sliding-contact material 10 is formed on the rear surface 120 of the glass sealing lip 12 and the inner surface 110 of the pillar portion 112 of the body 11.

The glass-run channel 18 has an operation and effect similar to those of the glass-run channel 1.

While the invention has been described with reference to embodiments, it is to be understood that modification or variations may be easily made by a person of ordinary skill in the art without departing from the scope of the invention which is defined by the appended claims.

What is claimed is:

1. A glass-run channel, comprising:

a sectionally U-shaped body which is installed on a window frame of a door of a vehicle; and a glass sealing lip having a front surface which slidably contacts a windowpane which is opened and closed, and a rear surface which does not contact said windowpane, a portion of said rear surface that contacts an inner surface of the body being covered with a sliding-contact material formed of a material different from that of the body and having a high degree of sliding-contact performance.

2. The glass-run channel according to claim 1, wherein the sliding-contact material having a high degree of sliding-contact performance is formed of a thermoplastic elastomer, an olefin resin, and a fatty amide.

3. The glass-run channel according to claim 1, wherein the sliding-contact material having a high degree of sliding-contact performance is formed of a thermoplastic elastomer and a polymeric olefin resin.

4. A glass-run channel, comprising:

a sectionally U-shaped body having an inner surface, which is installed on a window frame of a door of a vehicle; and a glass sealing lip having a front surface which slidably contacts a windowpane which is opened and closed, and a rear surface which contacts said inner surface of said body and does not contact said windowpane, a portion of said inner surface of said body that contacts said rear surface of said glass sealing lip being covered with a sliding-contact material formed of a material different from that of the body and having a high degree of sliding-contact performance.

5. The glass-run channel according to claim 4, wherein the sliding-contact material having a high degree of sliding-contact performance is formed of a thermoplastic elastomer, an olefin resin, and a fatty amide.

6. The glass-run channel according to claim 4, wherein the sliding-contact material having a high degree of sliding-contact performance is formed of a thermoplastic elastomer and a polymeric olefin resin.

* * * * *